United States Patent
Wei et al.

(10) Patent No.: US 8,193,735 B2
(45) Date of Patent: Jun. 5, 2012

(54) LED LAMP WITH HIGH EFFICACY AND HIGH COLOR RENDERING AND MANUFACTURING METHOD THEREOF

(75) Inventors: Lan Wei, Xiamen (CN); Junxiang Han, Xiamen (CN); Guochun Liao, Xiamen (CN)

(73) Assignee: Xiamen Topstar Lighting Co., Ltd., Xiamen (CN)

( * ) Notice: Subject to any disclaimer, the term of this patent is extended or adjusted under 35 U.S.C. 154(b) by 438 days.

(21) Appl. No.: 12/527,021

(22) PCT Filed: Feb. 15, 2008

(86) PCT No.: PCT/CN2008/000352
§ 371 (c)(1),
(2), (4) Date: Aug. 13, 2009

(87) PCT Pub. No.: WO2008/101411
PCT Pub. Date: Aug. 28, 2008

(65) Prior Publication Data
US 2010/0072919 A1    Mar. 25, 2010

(30) Foreign Application Priority Data

Feb. 16, 2007  (CN) .......................... 2007 1 0008637

(51) Int. Cl.
  G05F 1/00    (2006.01)
  H05B 37/02   (2006.01)
  H05B 39/04   (2006.01)
  H05B 41/36   (2006.01)
(52) U.S. Cl. ......... 315/294; 315/150; 315/152; 315/291
(58) Field of Classification Search .................. None
  See application file for complete search history.

(56) References Cited

U.S. PATENT DOCUMENTS 6,577,073 B2   6/2003   Shimizu et al.
7,791,092 B2 *  9/2010   Tarsa et al. ..................... 257/98

FOREIGN PATENT DOCUMENTS

CN   1326230 A   12/2001
CN   1610137 A    4/2005
CN   1630107 A    6/2005

* cited by examiner

*Primary Examiner* — Anh Tran
(74) *Attorney, Agent, or Firm* — Rabin & Berdo, P.C.

(57) ABSTRACT

A LED lamp and a manufacturing method thereof are disclosed. At least one blue LED chip can be used as an excitation light source. A number of red LED chips are arranged around the blue LED chip. The blue LED chip and red chips are covered with a packaging material with phosphor. The intensity of red light can be adjusted by a control circuit. Thus, the white LED lamps with high efficacy and high color rendering at different color temperatures can be achieved.

6 Claims, 4 Drawing Sheets

LED LAMP WITH HIGH EFFICACY AND HIGH COLOR RENDERING AND MANUFACTURING METHOD THEREOF

FIELD OF THE INVENTION

The present invention relates to light-emitting diode (LED) lamp, and more particularly relates to a LED lamp with high efficacy and high color rendering and manufacturing method thereof.

BACKGROUND OF THE INVENTION

Since the blue LED chip has come forth, the LED lamp has been developing rapidly. The blue LED chip is used as an excitation light source to excite the YAG phosphor to produce yellow light, then the yellow light is mixed with the rest of the blue light of the blue chip except the portion which excites the phosphor to produce white light. This white LED has high efficacy and high color rendering in high color temperature, however, the color rendering in low color temperature is too low to meet the requirement of general illumination. Therefore, for resolving the problem of the above-mentioned problem, generally, the red LED phosphor is added into the yellow phosphor to enhance the red light of the white LED so as to increase the color rendering index, but this will reduce the luminous flux too much, thus it is not applicable. The method of adding red LED lamps to the white LED lamp was disclosed in the patent of U.S. Pat. No. 6,577,073B2, 2003, which can reduce the color temperature of the white LED lamp to increase the color rendering index. However, normal blue LED chips only have lower power, and each granule only has two chips (one blue LED chip and one red LED chip). The white LED is formed by adjusting the intensity of the blue LED chip and red LED chip respectively. Accordingly, this needs a complex control circuit and is hard to adjust, thus it needs to be improved further.

SUMMARY OF THE INVENTION

It is therefore an object of the present invention to provide a method of manufacturing a LED lamp with high efficacy and high color rendering, which is easily controlled and is fit for being used as general illumination.

Another object of the present invention is to provide a LED lamp with high efficacy and high color rendering, which has simple structure and is fit for being used as general illumination.

These and other objects of the present invention are achieved by: exciting the phosphor by the blue light emitted by the blue chip to produce yellow light. The yellow light, the rest blue light of the blue chip except the portion which exciting the phosphor and the red light emitted by the red chip are mixed to generate a multicolor light, by the reasonable arrangement of the blue chip and red chip and reasonable design of control circuit, and by adjusting the intensity of the red light, the white LED lamp with different color temperature can be achieved.

More specifically, the solution is as follows: at least one blue LED chip is used as an excitation light source and a number of red LED chips are arranged around the blue LED chip, the intensity of red light can be adjusted by a control circuit, thus the white LED lamps with different color temperatures can be achieved.

Said a number of red LED chips are around the blue LED chip and electrically connected to the blue chip, phosphor and packaging material are covered on the blue chip and red ships, and the intensity of the red light is adjusted by the control circuit Said blue LED chips and red LED chips are arranged on the pedestal orderly, and the red LED chips are electrically connected to the blue LED chips, all of the chips are covered with phosphor and packaging material.

The peak wavelength of said blue LED chip is in the range of 440~480 nm, preferably, in the range of 450~470 nm; the peak wavelength of said red LED chip is in the range of 600~670 nm, preferably, in the range of 610~650 nm; the peak wavelength of said phosphor is in the range of 520~580 nm, preferably, in the range of 540~560 nm.

Another solution:

a LED lamp with high efficacy and high color rendering comprises at least one blue LED chip, a number of red LED chips, phosphor, packaging material and a control circuit, both the blue LED chips and the red LED chips are covered with phosphor and packaging material, said control circuit electrically connected to the blue LED chips and red LED chips so as to provide power to the blue LED chips and adjust the intensity of the red LED chips.

Said packaging material mixed with phosphor, the packaging material mixed with phosphor covered on the blue LED chips and red LED chips.

Said a number of red LED chips are arranged around the blue LED chips.

Said blue LED chips and red LED chips are fixed on the pedestal orderly.

Said control circuit only adjusted the intensity of the red LED chips.

The peak wavelength of said blue LED chip is in the range of 440~480 nm, preferably, in the range of 450~470 nm; the peak wavelength of said red LED chip is in the range of 600~670 nm, preferably, in the range of 610~650 nm.

The peak wavelength of said phosphor is in the range of 520~580 nm, preferably, in the range of 540~560 nm. The intensity of said red LED chips are adjusted by the control circuit.

Said LED pedestal has one blue chip and four red LED chips inside.

By above-mentioned method of the present invention, excite the phosphor by the blue color light emitted by the blue chip to produce yellow light, the yellow light, the rest blue light of the blue chip except the portion which exciting the phosphor and the red color light emitted by the red chip are mixed to produce a multicolor light, by add the blue LED chip and the red LED chip, the reasonable arrangement of the blue chip and red chips and the design of the control circuit, and by adjust the intensity of the red light of the red LED chips, the white LED lamp with different color temperature can be achieved. Compared to the invention of U.S. Pat. No. 6,577,073B2, a white LED lamp with wider color temperature can be obtained by adjusting a number of blue LED chips and a number of red LED chips, and the power of the blue LED chips can be selected with 0.5 W, 1 W or more than 1 W, thus a white LED lamp with higher power can be obtained, this white LED lamp has a color temperature range of 2500K-7000K, it is with high efficacy and high color rendering and is fit for being used as general illumination. In addition, the efficacy of the white LED is approximately equal to the general fluorescent lamp and three-band fluorescent lamp, and has more excellent color rendering, longer service life and more environmentally friendly than the general fluorescent lamp and three-band fluorescent lamp, therefore, the white LED lamp is important to the development of general illumination in future. And the present invention only adjust the intensity of the red LED chips, thus the control circuit is simpler.

DETAILED DESCRIPTION OF THE PREFERRED EMBODIMENT

Embodiment 1

Figure 1:
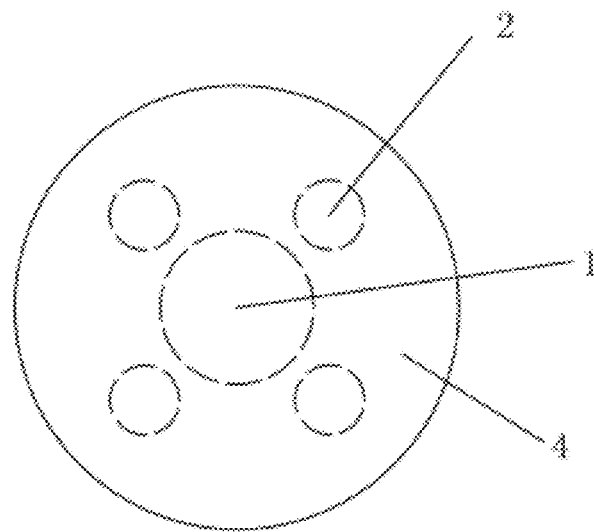
FIG. 1 is a top view of the present invention in embodiment 1.
Figure 2:
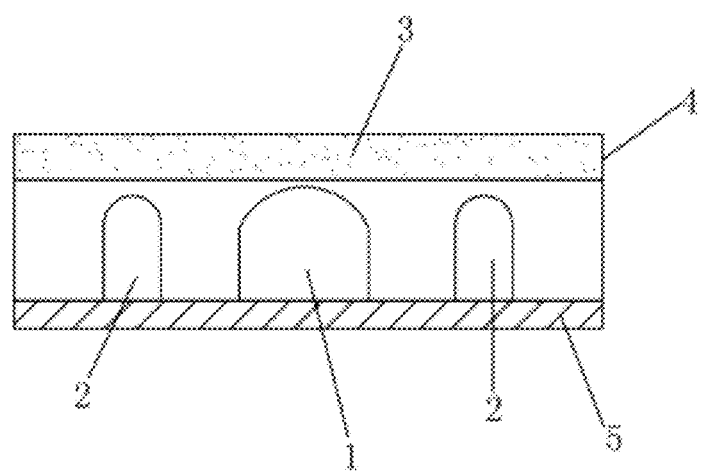
FIG. 2 is a side view of the present invention in embodiment 1.
Figure 3:
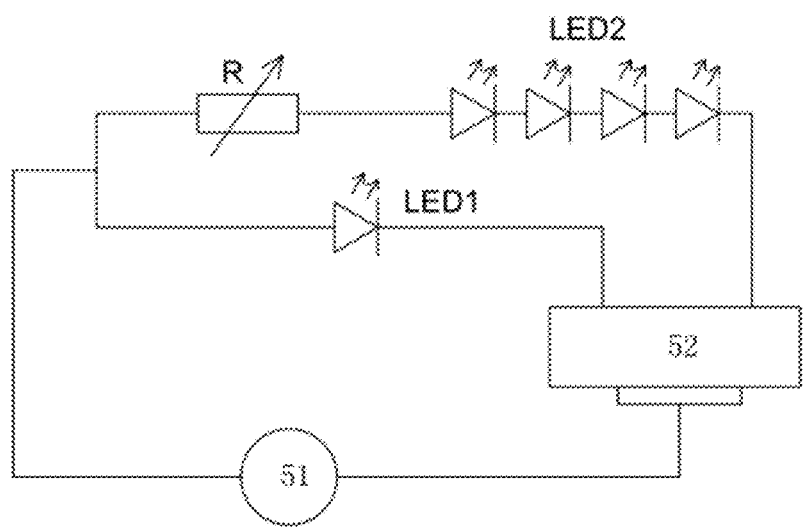
FIG. 3 schematically illustrates the circuit of the present invention in embodiment 1.

Referring to FIG. 1 and FIG. 2, the LED lamp with high efficacy and high color rendering comprises one blue LED chip 1, four red LED chips 2, phosphor 3, packaging material 4 and a control circuit 5.

Herein the peak wavelength of the blue LED chip is in the range of 440~480 nm, preferably, in the range of 450~470 nm. The amount of the blue LED chip 1 can be set according to the requirement (the needed power), and the number is at least one, the power of the blue LED chip can be 0.5 W, 1 W or more than 1 W.

The peak wavelength of the red LED chip is in the range of 600~670 nm, preferably, in the range of 610~650 nm. The number of red LED chips 2 is two or more.

The phosphor 3 is YAG phosphor ($Y_3Al_5O_{12}$:Ce), without limitation, the other phosphor such as $(Y,Gd)_3Al_5O_{12}$:Ce, $Y_3(Al,Ga)_5O_{12}$:Ce are also applicable, the phosphor having a peak wavelength between 520~580 nm, and the preferred peak wavelength is between 540~560 nm.

The phosphor 3 and packaging material 4 cover the blue LED chip 1 and red blue chips 2. Specifically, the packaging method can be as follows: mix the phosphor 3 with the packaging material 4, then the packaging material 4 mixed with phosphor 3 is covered on the blue LED chip 1 and the red blue chips 2, or the phosphor 3 and packaging material 4 is covered on the blue LED chip 1 and red blue chips 2 respectively. However, the packaging method is not limited by the above-mentioned ways.

In this embodiment the blue LED chip 1 is arranged in the center and the four red LED chips 2 are around the blue chip 1; the control circuit 5 comprises a power source 51, a driving circuit 52 and an adjustable resistor R; the four red LED chips 2 are connected to the adjustable resistor R in series, with one end of the red LED chips being connected to the power 51 and the other end being connected to driving circuit 52; one end of the blue chip 1 is connected to power 51, and the other end is connected to driving circuit 52 to form an electrical connection.

Figure 4:
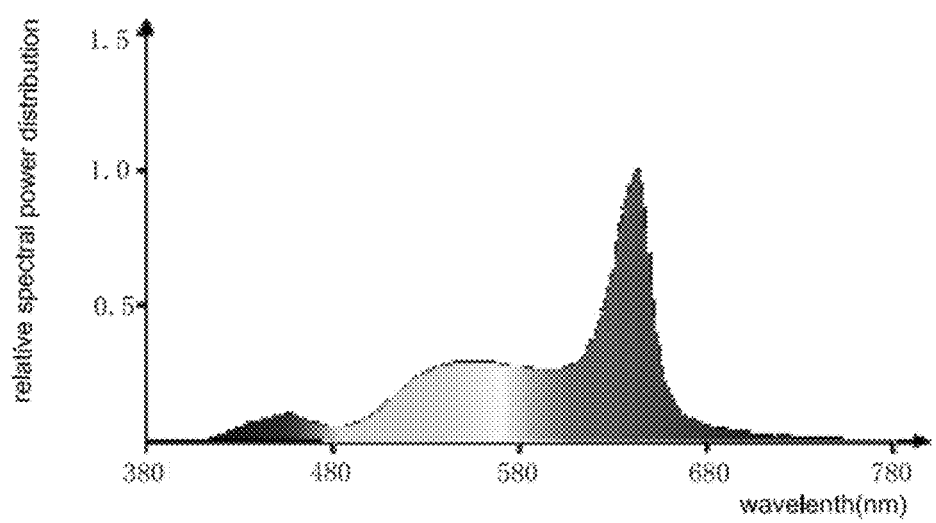
FIG. 4 is a graph illustrating a schematic spectral distribution of the 2700K LED lamp of the present invention.
Figure 5:
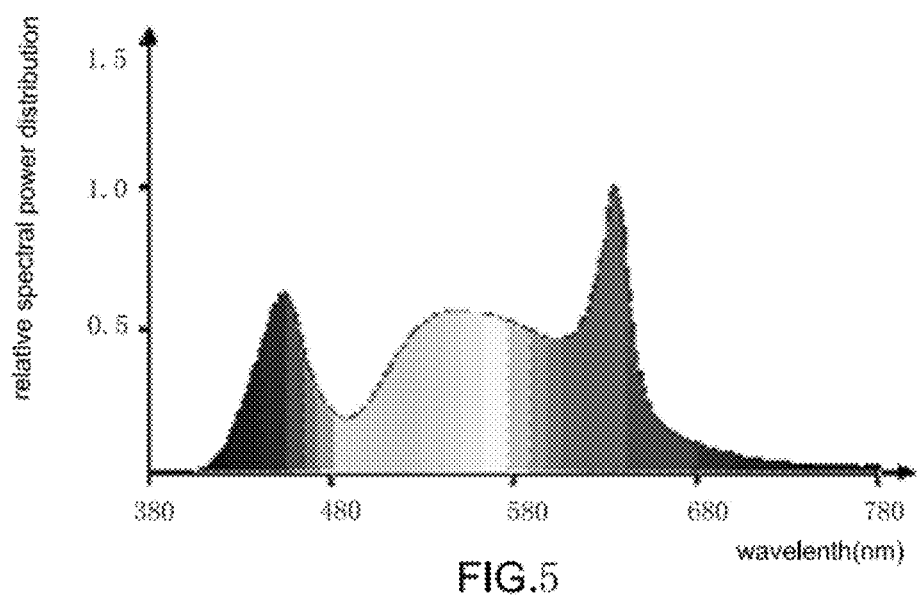
FIG. 5 is a graph illustrating a schematic spectral distribution of the 4000K LED lamp of the present invention.
Figure 6:
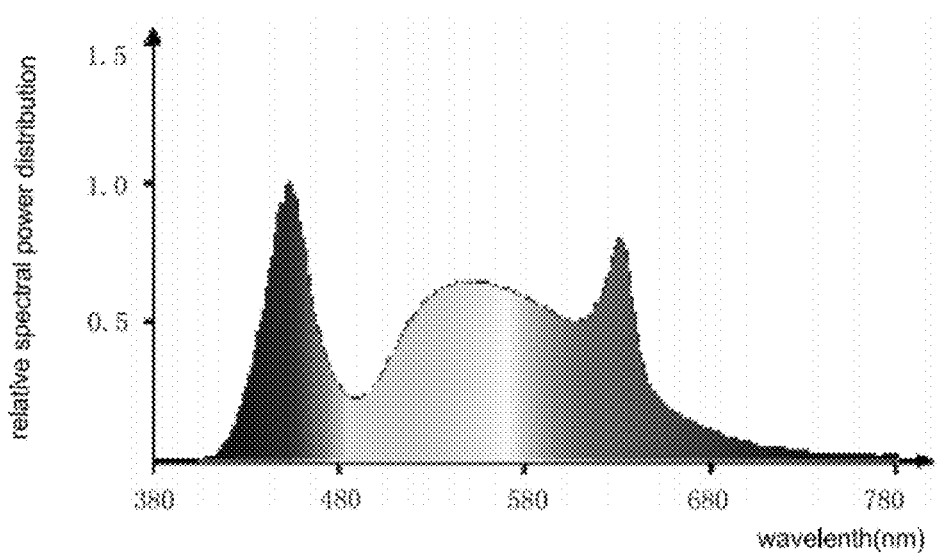
FIG. 6 is a graph illustrating a schematic spectral distribution of the 5000K LED lamp of the present invention.

In operation, the control circuit 5 provides power for the blue LED chip 1, then the blue LED chip 1 emits blue light to excite the phosphor to produce yellow light, the yellow light, the rest blue light of the blue chip except the portion which exciting the phosphor and the red light emitted from the red chip 2 adjusted by the control circuit are mixed to produce a white light of LED. Thus, 2700K, 4000K and 5000K light sources are obtained, and the spectral distribution of these light sources are shown in FIG. 4, FIG. 5 and FIG. 6 respectively, in which the data of the luminous flux, color rendering, color temperature etc. are as follows respectively:

| Color temperature, (K) | Chromaticity coordinates (x/y) | Color rendering Index, (Ra) | Luminous flux (lm) | Efficacy (lm/W) |
|---|---|---|---|---|
| 2714 | 0.4646/0.4210 | 86.0 | 60 | 51 |
| 4233 | 0.3690/0.3631 | 91.2 | 65 | 58 |
| 5254 | 0.3386/0.3404 | 87.3 | 67 | 62 |

Thus it can be seen, the white LED lamp of the present invention has a color temperature between 2500K to 7000K, which is high efficacy and high color rendering and is fit for being used as general illumination, and the efficacy of the white LED is approximately equal to the general fluorescent lamp and three-band fluorescent lamp, and has more excellent color rendering, longer operation life and more environmentally friendly than the general fluorescent lamp and three-band fluorescent lamp, therefore, the white LED lamp is important to the general illumination in future.

Embodiment 2

Figure 7:
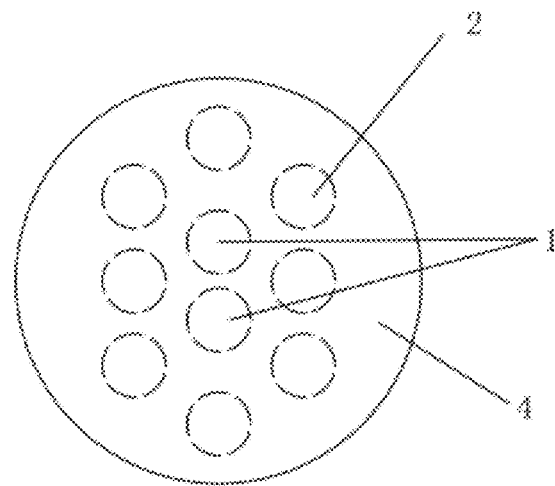
FIG. 7 is a top view of the present invention in embodiment 2.
Figure 8:
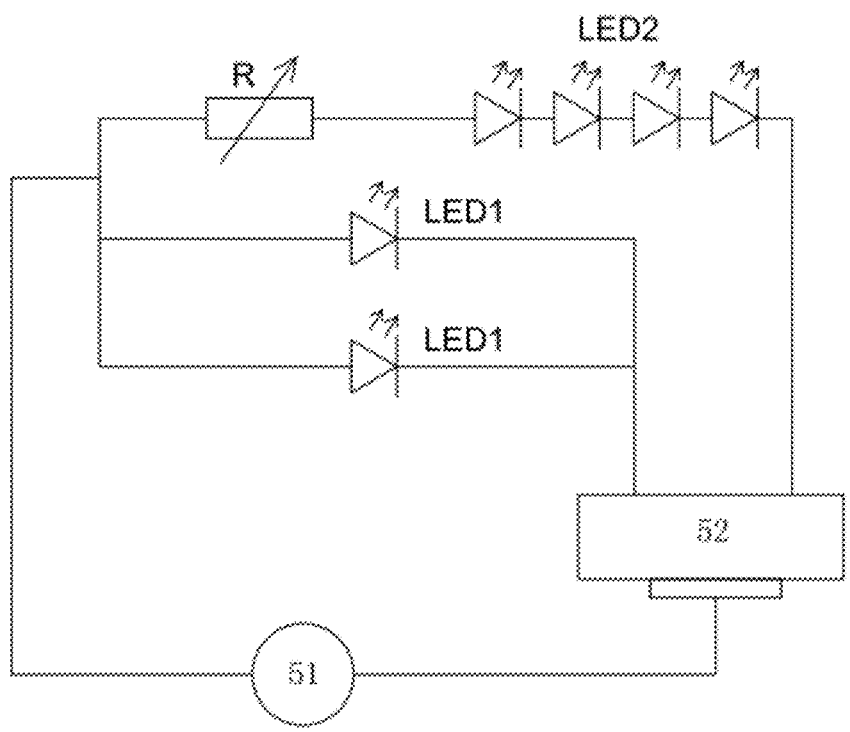
FIG. 8 schematically illustrates the circuit of the present invention in embodiment 2.

Referring to FIG. 7 and FIG. 8, the difference of this embodiment to embodiment 1 is that: the LED lamp comprises two blue LED chips 1, eight red LED chips 2, phosphor 3, packaging material 4 and a control circuit 5; the phosphor 3 covers the two blue LED chips 1 directly, then the two blue Led chips 1 and eight red LED chips 2 are sealed by the packaging material 4, and connected to the control circuit 5.

In this embodiment the two blue LED chips 1 are arranged in the center and the eight red LED chips are around the two blue chips 1; the control circuit 5 comprises a power 51, a driving circuit 52 and an adjustable resistor R; the eight red LED chips 2 are connected to the adjustable resistor R in series, with one end of the red LED chips 2 being connected to the power 51 and the other end being connected to the driving circuit 52; the two blue LED chips are connected to each other in parallel, with one end of the blue chip 1 being connected to the power source 51, and the other end being connected to the driving circuit 52 to form an electrical connection. The control circuit 5 can be the other control circuit which can match the requirement of the present invention.

In operation, the control circuit 5 provides power for the two blue LED chips 1, the blue LED chips 1 emits blue light to excite the phosphor to produce yellow light, the yellow light, the rest blue light of the blue chip except the portion which exciting the phosphor and the red light emitted from the red chip 2 adjusted by the control circuit are mixed to produce a white light.

The number of the blue LED chip 1 and red LED chips 2 of the present invention can be set according to requirement, but the preferred number is one blue LED chip 1 and four red LED chips 2 in a LED pedestal in embodiment 1. Or two blue LED chips 1 and eight red LED chips 2 in a LED pedestal in embodiment 2. the arrangements of the blue LED chip 1 and red LED chips 2 depends on the requirement for producing even multicolor light, e.g. said red LED chips 2 can be arranged around the blue LED chips 1 (as shown in FIG. 1, FIG. 2 and FIG. 7), or several blue LED chips 1 and several LED chips 2 are mixed to arranged in the pedestal of the LED lamp (not shown for the sake of brevity).

INDUSTRIAL APPLICABILITY

A LED lamp and a manufacturing method thereof is disclosed in the present invention. Select at least one blue LED chip as an excitation light source, the blue LED chip is covered with phosphor and around by a number of red LED chips. The intensity of red light can be adjusted by a control circuit, thus, the white LED lamp with high efficacy and high color rendering at different color temperatures can be achieved.

Although the preferred embodiments have been described, the present invention is not limited to these embodiments, various changes and modifications can be made for the embodiments.

What is claimed is:

1. An LED lamp with high efficacy and high color rendering, comprising:
    a plurality of blue LED chips connected to each other in parallel;
    a plurality of red LED chips;
    phosphor covering both said blue LED chips and said red LED chips;
    packaging material covering both said blue LED chips and said red LED chips; and
    a control circuit connected to the blue LED chips and red LED chips so as to provide power to the blue LED chips and adjust the intensity of the red LED chips, the control circuit including a power source, a driving circuit and an adjustable resistor, the red LED chips being connected to the adjustable resistor in series, with one end of the red LED chips being connected to the power source and another end being connected to the driving circuit, one end of the blue chips being connected to the power source, and another end being connected to the driving circuit to form an electrical connection.

2. The LED lamp according to claim 1, wherein said red LED chips are arranged around the blue LED chips.

3. The LED lamp according to claim 1, wherein said blue LED chips and red LED chips are fixed on a pedestal orderly.

4. The LED lamp according to claim 1, wherein the red LED chips are arranged around the blue LED chips, the intensity of the red LEDs being adjusted by the control circuit.

5. The LED lamp according to claim 1, wherein a peak wavelength of said blue LED chips is in the range of 450~470 nm; a peak wavelength of said red LED chips is in the range of 610~650 nm; and a peak wavelength of said phosphor is in the range of 540~560 nm.

6. The LED lamp according to claim 1, wherein the red LED chips are connected to each other in series.

* * * * *